(12) United States Patent
Pierce

(10) Patent No.: US 6,244,147 B1
(45) Date of Patent: *Jun. 12, 2001

(54) WELD SAMPLE CUTTER

(75) Inventor: Kenneth R. Pierce, N. Barrington, IL (US)

(73) Assignee: The E. H. Wachs Company, Wheeling, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,766

(22) Filed: Sep. 2, 1998

(51) Int. Cl.$^7$ ........................................ B26D 7/06
(52) U.S. Cl. .................. 83/100; 83/168; 83/409; 83/437.1; 83/522.19
(58) Field of Search ................... 83/36, 54, 704, 83/730, 437.1, 452, 919, 100, 101, 168, 466, 574, 409, 522.19; 29/229, 268, 239

(56) References Cited

U.S. PATENT DOCUMENTS

| | | | |
|---|---|---|---|
| 914,299 | * 2/1909 | McCarthy | 83/466 |
| 2,174,837 | * 10/1939 | Rasmussen | 83/466 |
| 2,249,814 | * 7/1941 | Eastwood | 83/466 |
| 2,455,165 | * 8/1948 | Feitl | 29/229 |
| 2,573,991 | * 11/1951 | Schildknecht | 83/743 |
| 2,746,125 | * 5/1956 | Cuny | 83/810 |
| 2,949,801 | * 8/1960 | Mills | 83/168 |
| 3,040,420 | * 6/1962 | Kulp | 29/229 |
| 3,057,240 | * 10/1962 | De Witt | 83/473 |
| 3,460,418 | * 8/1969 | Mathe et al. | 83/168 |
| 3,485,123 | * 12/1969 | Komendowski | 83/168 |
| 3,673,903 | * 7/1972 | Evans | 83/168 |
| 3,881,385 | * 5/1975 | Coy | 83/466 X |
| 4,280,265 | * 7/1981 | Murphy | 29/229 |
| 4,318,323 | * 3/1982 | Voorhees et al. | 83/168 |
| 4,367,665 | * 1/1983 | Terpstra et al. | 83/473 X |
| 4,769,911 | * 9/1988 | Araki | 30/94 |
| 5,199,221 | * 4/1993 | Hillestad | 83/745 X |
| 5,445,056 | * 8/1995 | Folci | 83/100 |
| 5,680,704 | * 10/1997 | Okubo et al. | 30/124 |
| 5,738,268 | * 4/1998 | VanderPol et al. | 228/103 |

* cited by examiner

*Primary Examiner*—Rinaldi I. Rada
(74) *Attorney, Agent, or Firm*—Robert L. Marsh

(57) ABSTRACT

A weld sample cutter has a rotating saw blade and a vice. The vice has jaws which will retain a cylindrical work piece so that it can be cut either longitudinally or transversely by the blade. The vice is movable along a slide plate so that the work piece held in the vice can be moved toward or away from the saw blade.

13 Claims, 8 Drawing Sheets

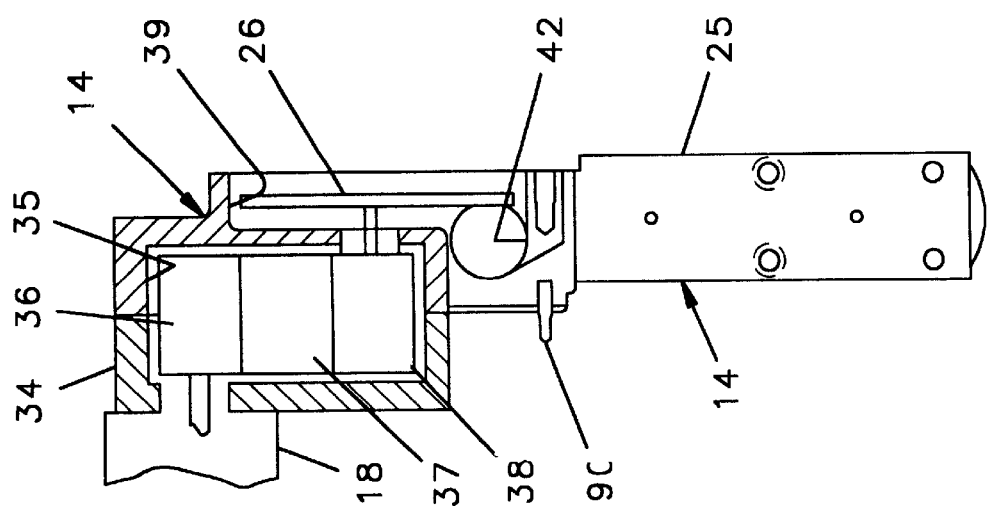
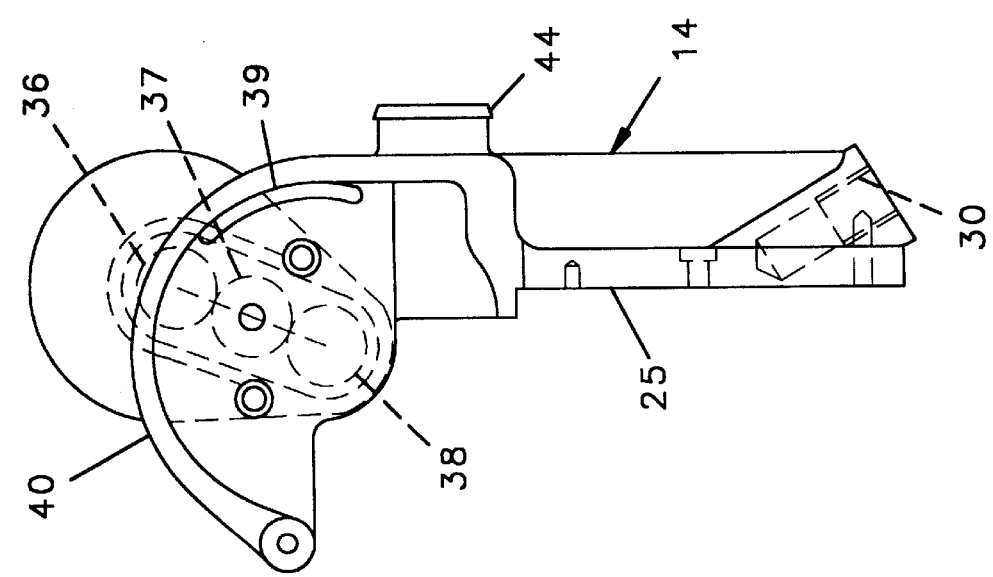
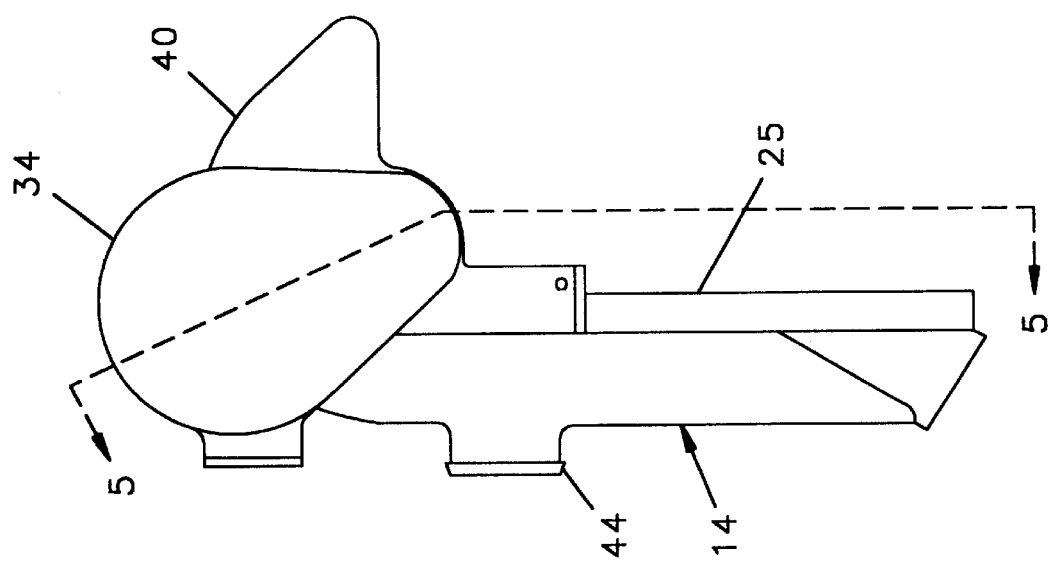

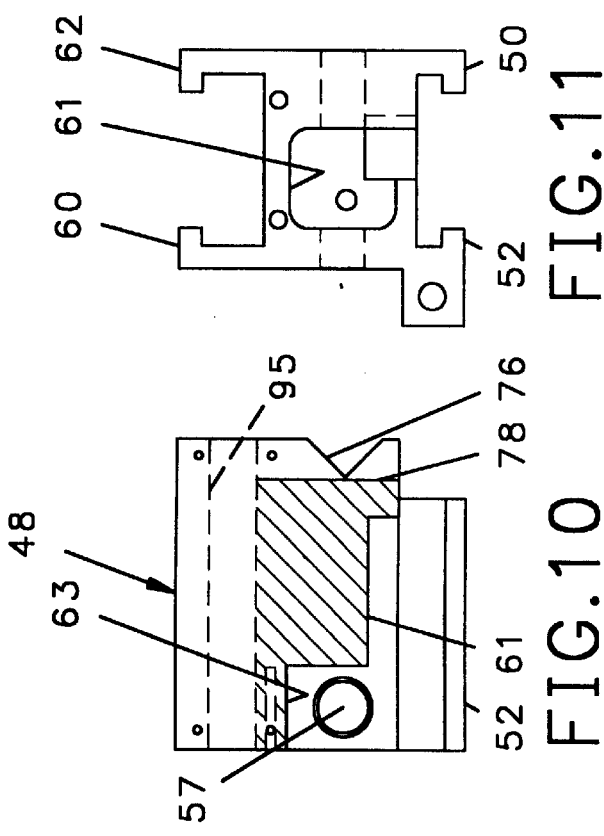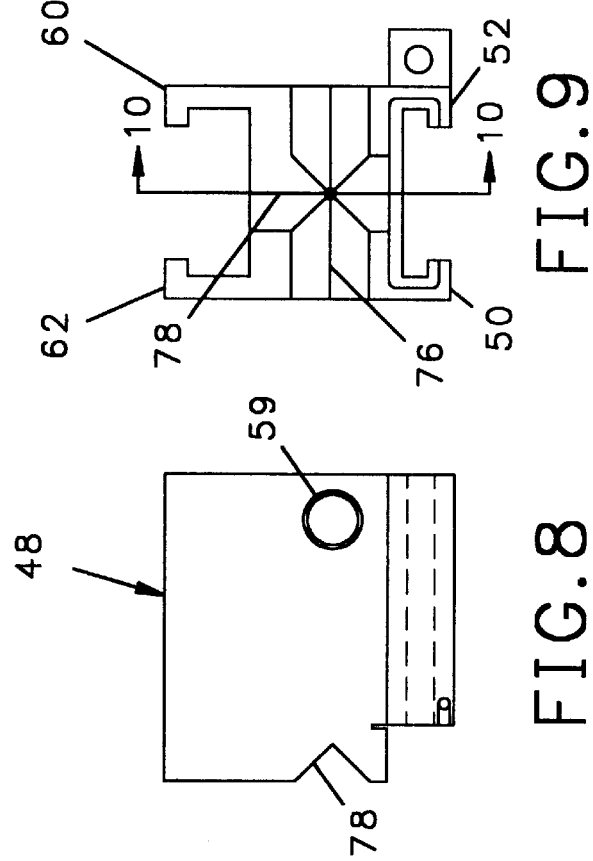

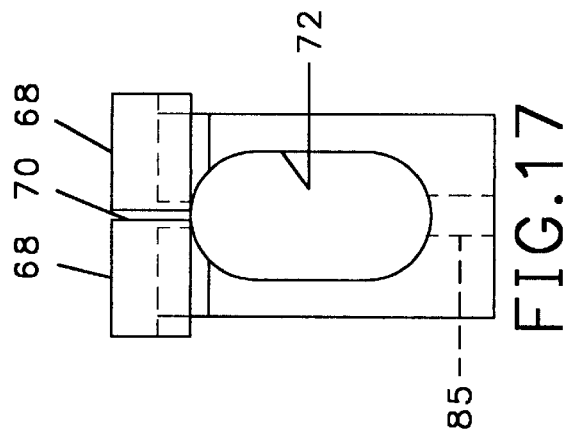
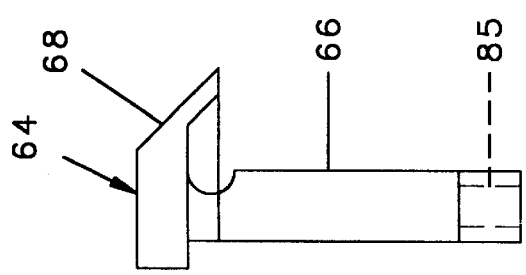
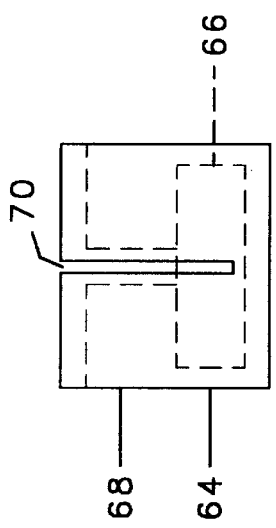
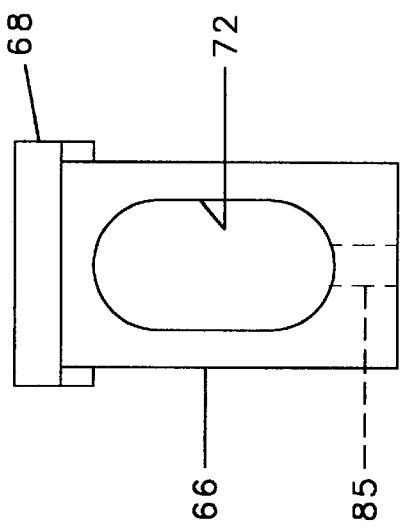
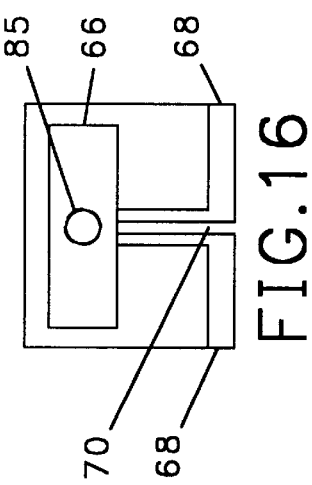

WELD SAMPLE CUTTER

The present invention relates to machines used to cut metal tubes, and in particular to a machine to cut a sample of tubing both longitudinally and transversely for the purposes of opening the sample into a flat strip so that the inner surface of the weld is visible and the quality of a weld can be inspected.

BACKGROUND OF THE INVENTION

The semi-conductor industry undertakes the precision manufacture of small parts, and the machinery required to make those parts uses purified pressurized liquids which pass through long lengths of tubing. The tubing used in such machines is very expensive because it has electropolished inner surfaces to prevent contamination of the purified liquids flowing therein. The lengths of tubing are formed by welding sections of tubing end to end. Such tubing typically has a diameter ranging from ⅛ inch to 1 inch or more and the welds that join the lengths must be perfectly formed such that the tube, including the welds, will not contaminate the liquid passing therethrough. Also, the welding process consumes materials which could contaminate the liquid passing through the tube, and if the weld is not perfectly formed, traces of unconsumed welding material may remain on the inner surface of the tube.

To test the quality of a weld, a welding machine is first used to weld the ends of two short pieces of tubing together, after which a length of the sample, including the weld, is cut lengthwise, and the sample is rolled opened and laid flat so that the inner surface thereof can be inspected. The quality of a weld can be determined by visually inspecting the color and texture of the weld surface.

To maintain the required quality of the weld made by a welding machine a sample weld is inspected by independent inspectors at regular intervals. Some specifications require that samples be inspected at the beginning and at the end of each day while other specifications require that an inspection be made as frequently as every tenth weld. The inspectors mark each sample they inspect and retain the samples as evidence that the inspections were properly conducted.

Prior to the present invention, to prepare a weld sample for inspection, a length of tubing including a sample weld was manually moved against a rotating blade to first make a longitudinal cut in the length of the sample, after which a second transverse cut was also manually made. Ideally, the second cut would not be made through the entire cross section of the tubing, leaving a small section of the tubing wall to retain the cross-cut sample to the remaining tubing length. After the sample has been cut, pliers or other tools were used to spread the sample flat so that it could be visually inspected.

SUMMARY OF THE INVENTION

Briefly, the present invention is embodied in a machine having a rotating cutting blade and a vise for gripping a cylindrical work piece and retaining a work piece while it is being cut by the blade. The vise has first and second gripping portions which interact to grip around a cylindrical work piece and retain it for making a cut either longitudinally or transversely to the length thereof. The vise is slidably movable toward and away from the rotating blade and a work piece retained therein is cut as the vise is moved toward the blade.

GENERAL DESCRIPTION OF THE DRAWINGS

A better and more complete understanding of the present invention will be had from a reading of the following detailed description taken in conjunction with the accompanying drawings wherein:

FIG. 3 is a left side elevational view of the housing for the machine shown in FIG. 1;

FIG. 4 is a right side elevational view of the housing shown in FIG. 3 with interior portions shown in phantom lines;

FIG. 5 is a cross sectional view of the housing shown in FIG. 3 taken through line 5—5 thereof with the saw blade and a fragment of the motor attached thereto;

FIG. 8 is a side elevational view of the slide block for the machine shown in FIG. 1 with a through hole shown in broken lines;

FIG. 9 is a top elevational view of the slide block shown in FIG. 8;

FIG. 10 is a cross-sectional view through line 10—10 of FIG. 9 of the slide block shown in FIG. 8;

FIG. 11 is a bottom view of the slide block shown in FIG. 8;

FIG. 12 is a front elevational view of the slide block shown in FIG. 8 with undercuts forming a guide channel shown in broken lines;

FIG. 13 is a front elevational view of the vise slide for the machine in FIG. 1;

FIG. 14 is a right side elevational view of the vise slide shown in FIG. 13;

FIG. 15 is a top view of the vise slide shown in FIG. 13;

FIG. 16 is a bottom view of the vise slide shown in FIG. 13;

FIG. 17 is a rear elevational view of the vise slide shown in FIG. 13;

DETAILED DESCRIPTION OF THE PREFERRED EMBODIMENT

Figure 1:
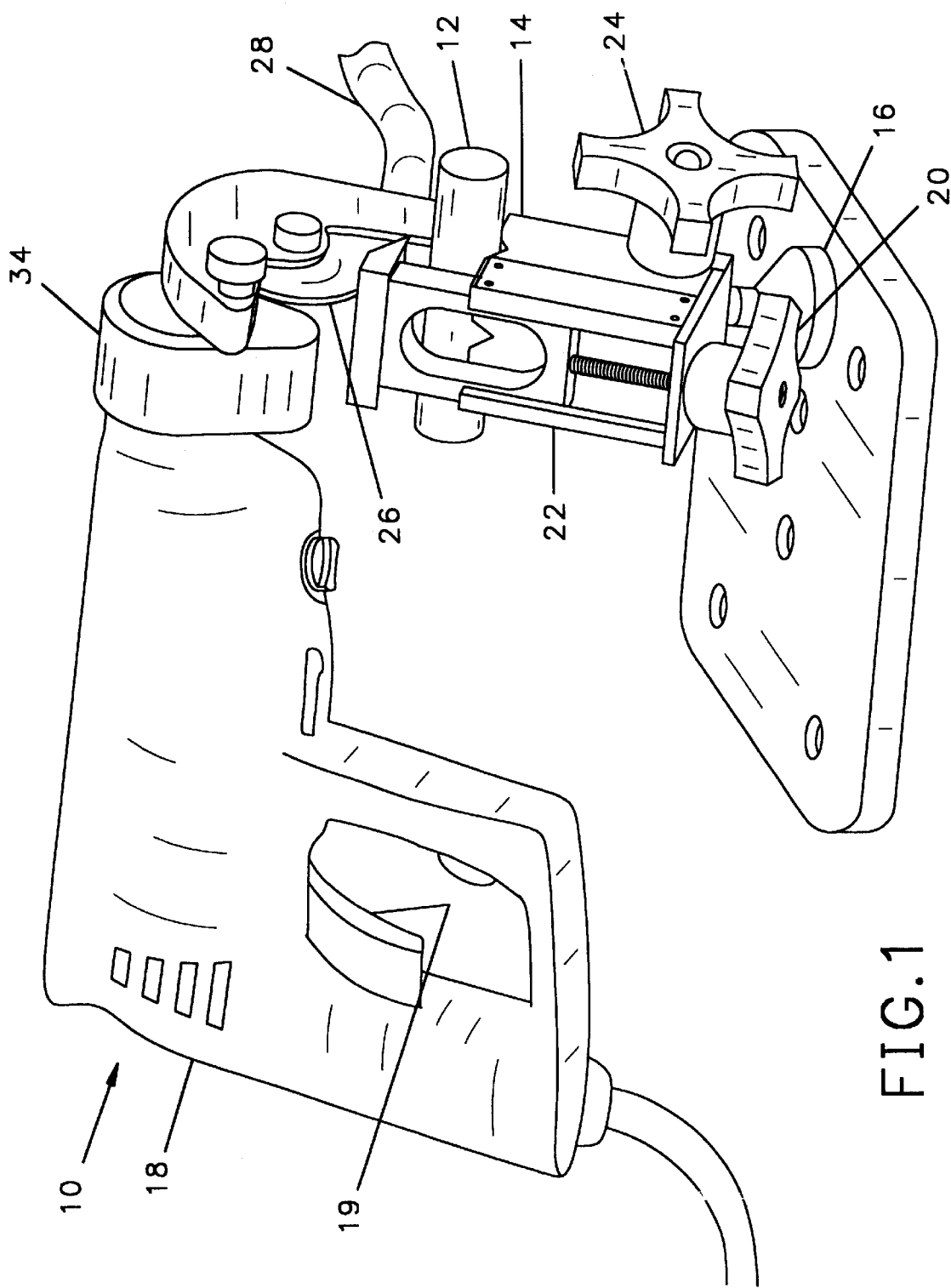
FIG. 1 is an isometric view of the machine in accordance with the present invention with a piece of tubing fitted transversely into the jaws of the vise thereof.
Figure 2:
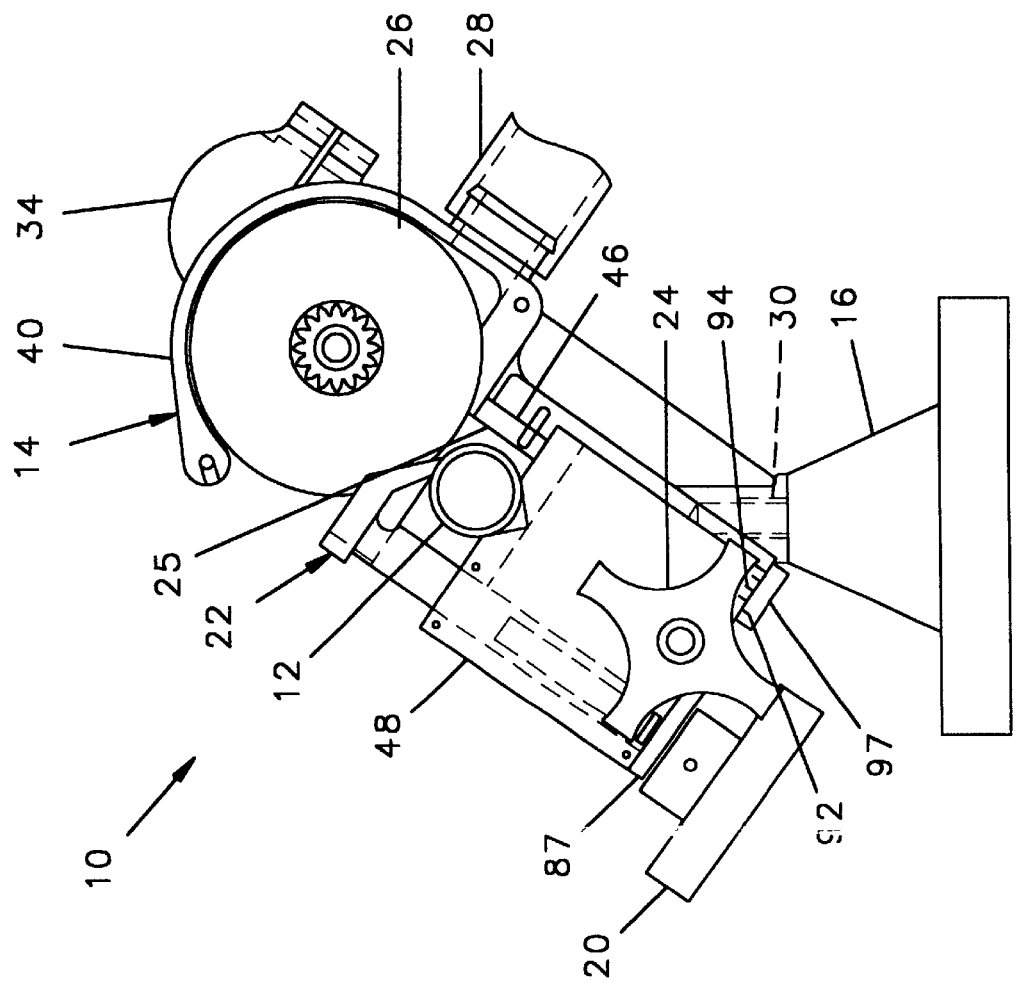
FIG. 2 is a side elevational view of the machine shown in FIG. 1 with portions of the interior thereof shown in phantom lines.

Referring to FIGS. 1 and 2, a machine 10 for cutting a weld sample for a piece of tubing 12 has a housing 14 mounted on a pedestal 16 and is driven by a motor 18 controlled by a switch 19. The machine 10 has a first knob 20 for adjusting the vise 22 as further described herein and a second knob 24 for moving the vise 22 vertically along a slide surface 25 on the housing 14 to thereby force the piece of tubing 12 in the vise thereof into a rotating saw blade 26.

Metal chips cut by the blade 26 are removed through a vacuum hose 28 to a collection site remote from the machine 10.

The housing 14 has a threaded bore 30 for receiving the threads of a stud on the pedestal 16 to retain the housing 14 with respect to the pedestal. For the purpose of this description, the elements of the machine 10 will be described with respect to their orientation as shown in FIGS. 1 and 2.

Referring to FIGS. 1–7, fitted against one side of the upper end of the housing 14 is a housing cap 34 and within a cavity 35 formed between the body of the housing 14 and the cap 34 are a plurality of gears 36, 37, 38 which transfer rotational power from the motor 18 to the saw blade 26. A guard 40 extends around a portion of the outer circumference of the saw blade 26 leaving exposed only a portion of the teeth thereof against which the tubular work piece 12 retained in the vise on the slide surface 25 can be moved. An arcuate wiper 39 made of pliable material such as felt or the like, is mounted around the inner edges of the guard and has sufficient thickness to press against the teeth of the blade 26 as it rotates. The arcuate wiper 39 will dislodge particles of metal clogged within the teeth of the blade 26 as it cuts through a work piece 12.

It is desirable that the saw blade 26 have small teeth. If the teeth of the blade 26 are too large, the teeth will bind around a small diameter work piece such as ⅛ inch diameter work piece and the binding will cause the mutilation of the work piece. On the other hand, it has been found that small particles of metal will become retained within smaller sized teeth and the retained particles of metal will prevent the saw blade from cutting efficiently. Inefficient cutting causes the blade to overheat and wear out after only a few cuts. The wiper 39 in the guard 40 removes small particles of metal which would otherwise remain between the teeth of the saw blade 26 and thereby maintains the efficiency of the blade 26 as it cuts a work piece 12. With the wiper 39, the blade can be made with a thickness of 30 thousandths of an inch and the blade is usable for 200 to 300 cuts.

Figure 7:
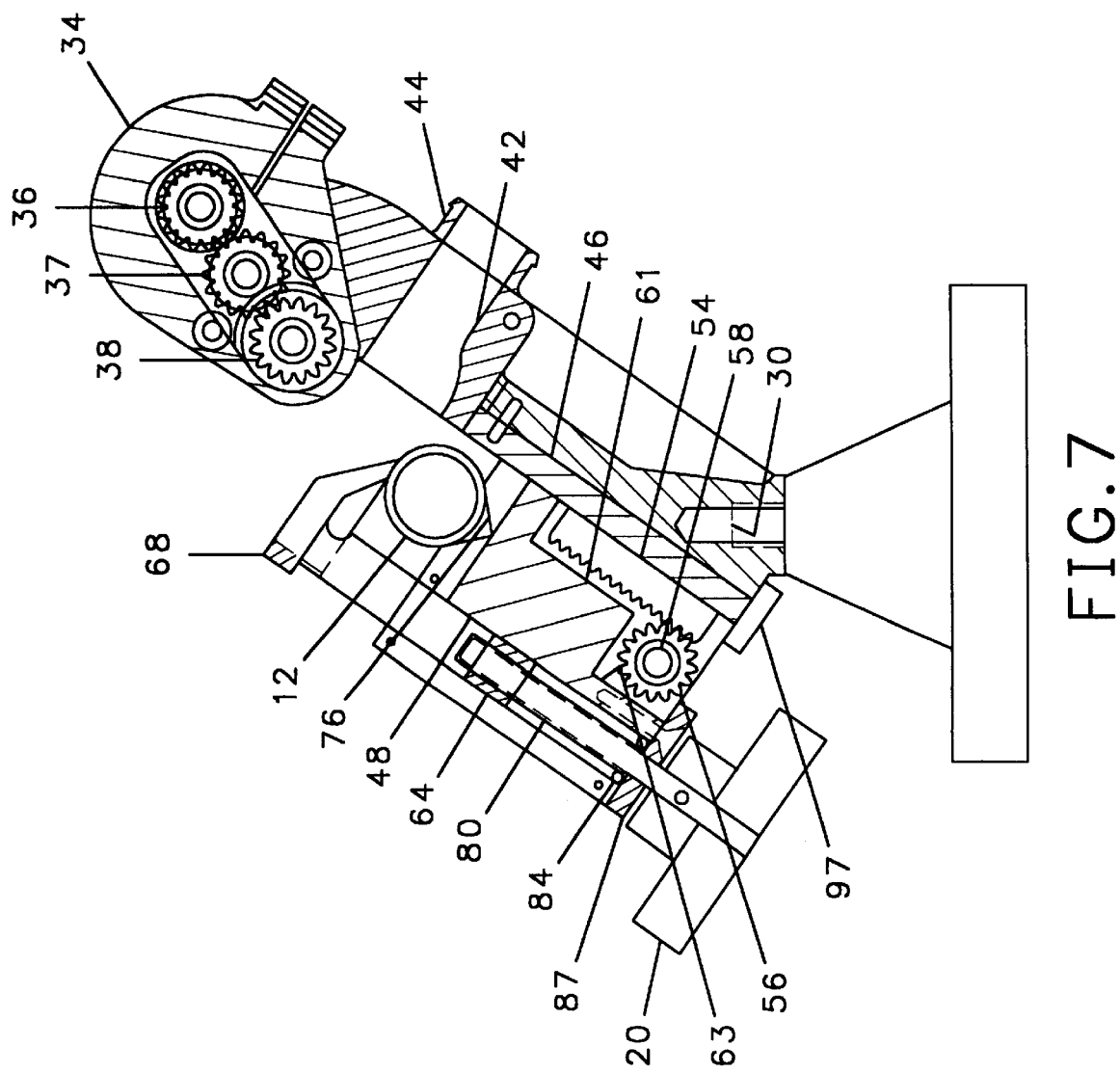
FIG. 7 is a cross-sectional view of the machine shown in FIG. 1 taken through line 7—7 of the vise as shown in FIG. 6.

As best shown in FIGS. 2, 5, and 7 the housing 14 further has a transverse hole 42 extending through the body thereof which serves as the vacuum port and on the rearward side of the housing 14 is a nipple 44 through which the transverse hole 42 extends and around which the vacuum hose 28 is fitted for drawing cuttings from the blade 26 away from the work site.

Although a wiper 39 discussed above is used to remove particles from the teeth of the blade 26, any other method whereby particles would be dislodged from the teeth could be employed. For example, the vacuum port 42 could be positioned to draw particles from between the teeth of the blade 26, or a pressurized air line could direct through the port across the teeth.

Referring to FIGS. 2 and 6–12, the housing 14 has an inclined slide surface 25 against which is positioned a slide plate 46. The slide plate 46 has a width which is wider than the width of the slide surface 25, and the vise 22 includes a slide block 48 having opposing hook shaped guides 50, 52 sized to fit around the edges of the slide plate 46 to slidably retain the slide block 48 to the slide plate 46. As seen in FIG. 7, extending longitudinally along the center of the slide plate 46 is an elongate rack 54 having teeth which are engaged by a pinion 56 fixed on a shaft 58 extending through holes 57, 59 in the block 48 and to the second knob 24. Rotation of the knob 24 will rotate the pinion 56 and move the slide block 48 and, therefore, the vise 22 along the slide plate 46. As best seen in FIGS. 7 and 10, the slide block 48 has an elongate cavity 61 therein to receive the rack 54 and an adjoining nearly cubically shaped cavity 63 to receive the pinion 56.

Referring to FIGS. 2 and 6–17, the slide block 48 has a second pair of opposing hook shaped guides 60, 62 which define a second track parallel to the track defined by guides 60, 62 and between the guides 60, 62 is fitted an elongate vise slide 64. The vise slide 64 has a generally rectangularly shaped slide portion 66 sized to slidably fit between the guides 60, 62 and at the upper end of the slide portion 66 is a tooth 68 with a slot 70 therein sized to receive the saw blade 26. The slide portion 66 of the vise slide 64 further has a transverse, generally oval shaped hole 72 having outer dimensions sized to receive the largest diameter of a work piece 12 for which the machine 10 is adapted to cut when the work piece is retained in the vise 22 as shown in FIG. 6.

The vise slide 64 moves perpendicular to the axis of the blade 26 such that movement of the slide block 48 upward along the slide plate 46 will move the two sides of the slotted tooth around the blade 26, thereby allowing the blade to cut a work piece held in the vise. The rotation of the second knob 24 will, therefore, move a work piece held in the vise 22 against the blade 26.

As best shown in FIGS. 9 and 10, extending parallel to the slide plate 46 along the upper surface of the slide block 48 is a V-shaped groove 76 and perpendicular to V-shaped groove 76 is a second V-shaped groove 78. The distal end of the slotted tooth 68 of the vise slide 64 is sized and positioned to move toward and away from the intersecting grooves 76, 78 upon movement of the slide portion 66 downward or upward within the slide block 48.

Figure 6:
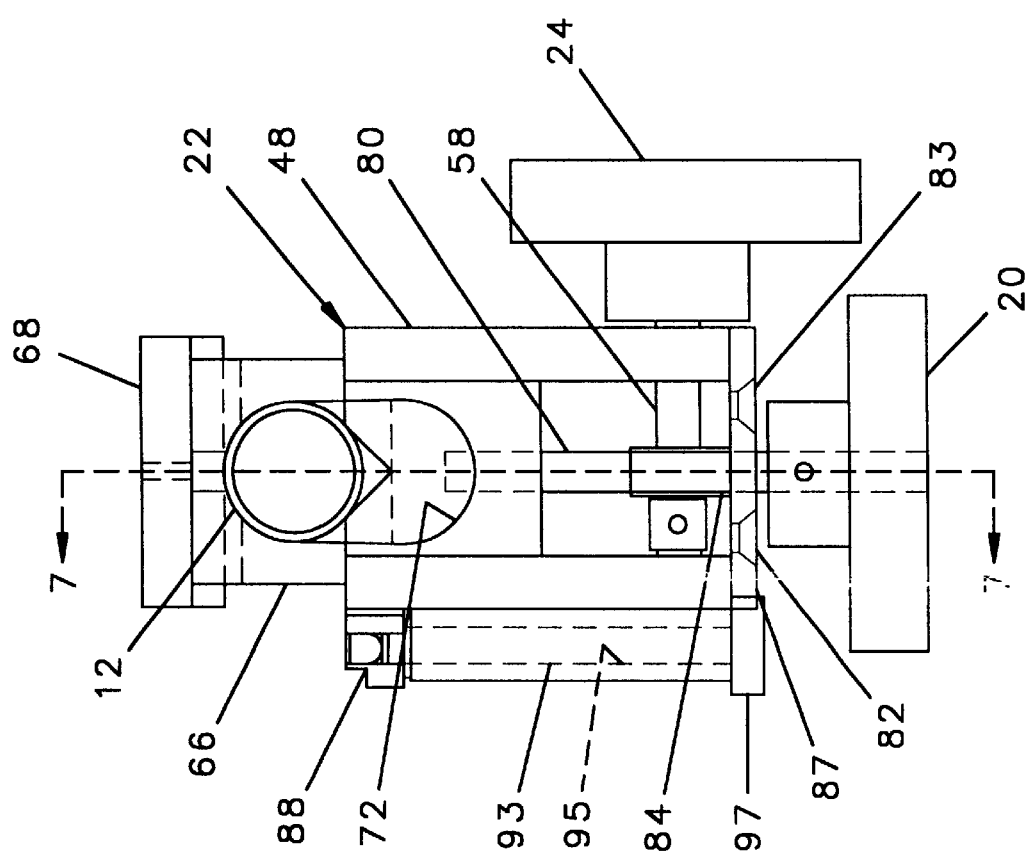
FIG. 6 is a front elevational view of the vise for the machine shown in FIG. 1.

Referring to FIGS. 2, 6 and 7, first knob 20 is fixedly mounted on a shaft 80 which is rotatably fitted through a mounting plate 87 retained by bolts 82, 83 to the slide block 48 and the shaft 80 is retained within the mounting plate 87 by a clip 84. The distal end of the shaft 80 is threaded and is threadedly received in a threaded hole 85 (shown in FIGS. 13, 14 and 17) in the bottom surface of the slide portion 66 of the vise slide 64.

Rotation of the first knob 20, therefore, will cause the shaft 80 to be threaded into or out of the hole 85 of the vise slide 64 thereby moving the slotted tooth 68 upwardly or downwardly with respect to the slide block 48. A work piece 12 can be retained in the vise 22 with the axis thereof parallel to the slide plate 48, as shown in FIGS. 1 and 2, by inserting it under the tooth 68 and in groove 76. Alternately, a work piece 12 can insert in the vise 22 with the axis thereof perpendicular to the slide plate 46, as shown in FIG. 6, by inserting it through the oval hole 72, along groove 78 and under tooth 68. Rotation of the knob 20 will tighten or loosen the grip of the vise 22 around a work piece which is to be retained in either orientation.

Figure 18:
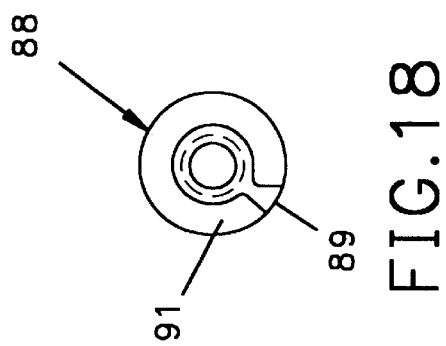
FIG. 18 is a top view of a cam for the machine shown in FIG. 1.
Figure 19:
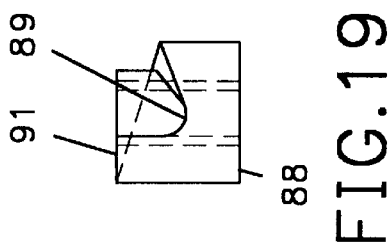
FIG. 19 is a side elevational view of the cam shown in FIG. 18 with the interior portions thereof shown in phantom lines of the cam shown in FIG. 18.

Referring to FIGS. 2, 6, 15, 18 and 19, the upward movement of the slide block 48 along the slide plate 46 is limited by a contact of an upper surface of a cam 88 against a pin 90 on the housing 14. As best shown in FIGS. 18 and 19, the cam 88 has a spiral ramp upper surface having a bottom position 89 and top position 91, and is fixedly mounted on a shaft 93 and secured to the opposite end of shaft 93 is a control knob 97. The shaft 93 is rotatable within an elongate hole 95 in the slide block 48 such that rotation of the shaft 93 will rotate the cam 88. When the cam 88 is oriented for the bottom position 89 to contact the pin 90 when the slide block is moved upward, the blade 26 will cut entirely through a work piece 12 retained in the vise 22. When the cam 88 is oriented for the top position 91 to contact the pin 90 when the slide block 48 is moved upward, the saw blade 26 will cut through the greater portion of the wall of the largest size work piece to be accepted by the machine, but leave uncut a small portion 99 as shown in FIG. 21.

As shown in FIG. 2, indicia numbers 92 around the outer surface of the knob 97 can be aligned by a marking line 94 on the housing to thereby adjustably limit the maximum upward movement of the slide block 48 with respect to the slide plate 46.

Figure 20:
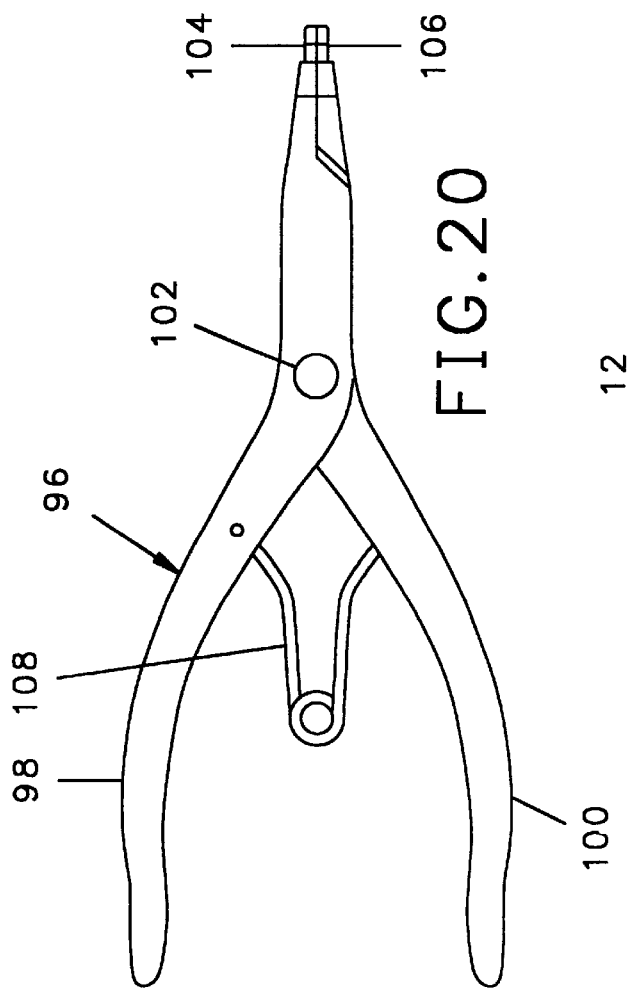
FIG. 20 is a side elevational view of a tool for use in conjunction with the machine as shown in FIG. 1.

Referring to FIGS. 20 the, machine 10 is used in conjunction with a tool 96 having first and second arms 98, 100, respectively, which are retained to each other about a centrally located pivot pin 102. The working ends of each of the arms 98, 100 have separator plates 104, 106, respectively, attached thereto the inner surfaces of which abut each other when the handle ends of the arms 98, 100 are in spaced from each other, as shown. A spring 108 between the arms 98, 100 retains the separator plate 104, 106 in abutting relationship to each other when the tool is in its standby condition. When the handle ends of the arms 98, 100 are squeezed toward each other, the spring 108 is compressed and the separator plates 104, 106 are moved apart from one another.

Figure 21:
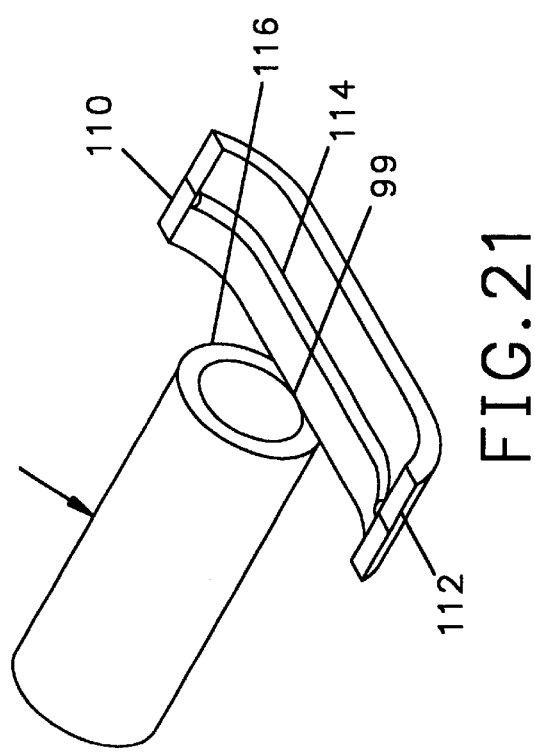
FIG. 21 is a perspective view of a piece of tubing which has been cut to expose the weld using the machine shown in FIG. 1 and the tool shown in FIG. 20.

Referring to FIGS. 21, the tool 96 is used to open the cut ends 110, 112 of a work piece by inserting the plates 104, 106 between the ends 110, 112 after the work piece has been longitudinally cut by the blade 26 of the machine 10. Once the plates 104, 106 are between the ends 110, 112, the handles of the tool are squeezed causing the plates 104, 106 to separate the ends 110, 112 of the sample to the orientation shown in FIG. 21.

OPERATION

To inspect a test sample of a weld, a short length of tubing 12, perhaps six inches in length, is cut with the weld 114 spaced approximately ½ inch from one face 116 thereof. The second knob 24 of the machine 10 is rotated to move the slide block 48 to the bottom of the slide plate 46 and the first knob 20 is rotated to raise the slotted tooth 68 of the vise. The work piece 12 is then fitted into the vise 22 as shown in FIG. 1 and retained therein by turning the first knob 20 until the work piece is tightly retained. Next, the knob 97 is rotated until the indicia numbers 92 thereon align with the markings 94 of the housing for the diameter of the work piece being cut to limit the upward movement of the slide block 48. The saw blade 26 will not cut all the way through the tubing 12, but will allow the pieces to be retained together by a small portion 99 as shown in FIG. 21. The switch 19 is then thrown to activate the motor 18 and rotate the saw blade 26. Then, the second knob 24 is then rotated to move the vise 22 upward along the slide plate 46 and force the sample tubing 12 against the saw blade 26 to make the transverse cut which forms face 116 shown in FIG. 21.

After the transverse cut has been completed, the second knob 24 is rotated in the opposite direction to lower the vise 22 away from the blade 26. The first knob 20 is turned to loosen the work piece 12 from the vise, and the work piece 12 is fitted through the transverse hole 72 in a slide portion 66 and between the tooth 68 and the V-shaped groove 78 and the vise 22 is again tightened as shown in FIG. 6. The first knob 20 is again turned to tighten the end of the work piece in the vise and the second knob 24 is again rotated to moved the work piece against the rotating saw blade 26 and make a longitudinal cut defining ends 110, 112.

Next, the work piece is then removed from the machine 10 and the separator plates 104, 106 of the tool 96 are fitted between the ends 110, 112 of the work piece and the handles compressed together to butterfly the ends of the work piece to the orientation shown in FIG. 21. The inner surface of the weld 114 can then be seen.

While the present invention has been described with respect to a single embodiment, it will be appreciated that many variations and modifications may be made without departing from the true spirit and scope of the invention. Therefore, it is intended by the appended claims to cover all such variations and modifications which come within the spirit and scope of the invention.

What is claimed:

1. A cutting machine comprising in combination:
   a housing,
   a cutting means on said housing,
   said cutting means having an axis of rotation,
   vise means mounted on said housing, said vise means for holding a cylindrical work piece having an outer surface and a longitudinal axis for being cut by said cutting means,
   said vise means having a first vise member and a second vice member,
   said first vise member moveable with respect to said second vise member,
   said first vise member having a first gripping surface and a second gripping surface,
   said second vise member having a third gripping surface and a fourth gripping surface, wherein said cylindrical work piece is retainable between said first and third gripping surfaces with said longitudinal axis in a first orientation and retainable between said second and fourth gripping surfaces with said longitudinal axis in a second orientation perpendicular to said first orientation, and
   one of said cutting means and said vise means moveable with respect to the other thereof for moving said work piece against said cutting means.

2. A cutting machine in accordance with claim 1 and further comprising an adjustable stop means for adjustably selecting the maximum depth of the cut made by said cutting means into said work piece.

3. A cutting machine in accordance with claim 2 wherein said adjustable stop means includes a cam having a cam surface, said cam on one of said cutting means and said vise means, and said cam surface contacting the other of said cutting means and said vise means for adjusting said depth of the cut.

4. A cutting machine in accordance with claim 2 and further comprising
   indicia numbers one of said cutting means and said vise means,
   a marking on the other of said cutting means and said vise means,
   said indicia numbers moveable with respect to said marker in response to movement of said one of said cutting means and said vise means with respect to the other of said cutting means and said vise means for measuring the depth of said cut.

5. A cutting machine in accordance with claim 1 wherein said cutting means is a blade having a side and further comprising a wiper having a surface in contact with only said side of said blade.

6. The cutting machine of claim 5 and further comprising,
   a cam having a cam surface, said cam on one of said housing and said vise means, a contact surface on the other of said housing and said vise for engaging said cam when said vise means is moved toward said blade, said cam surface contacting the other of said housing and said vise for adjusting said depth of the cut, indicia numbers on one of said vise means and said housing and a marking line on the other of said vise means and said housing, said indicia numbers moveable with respect to said marker in response to movement of said one of said cutting means and said vise means with respect to the other of said cutting means and said vise means for measuring the depth of said cut, said blade having a side surface, a wiper on said housing, said wiper having a surface in contact only with said side surface of said blade, and vacuum means for removing cutting particles from said saw blade.

7. The combination comprising, a cutting machining in accordance with claim 6, a pliers-type tool having a pair of handles and a pair of parallel plates which are separated from each other upon actuation of said handles, said plates having contact surfaces and outside surfaces, said contact surfaces movable toward and away from each other upon actuation of said handles, and said outer surfaces of said tool usable to open a weld sample cut by said cutting machine.

8. A cutting machine in accordance with claim 1 and further comprising said housing having a port there through, said port extending from an outer surface of said housing to an inner surface of said housing, said port positioned in near proximity to said cutting means, connecting means on said outer surface and surrounding said port for receiving a vacuum hose for removing cuttings from said cutting means.

9. A cutting machine in accordance with claim 1 wherein said cutting means is a saw blade having teeth and said machine further comprises an inner surface on said housing, a wiper on said inner surface and, said wiper wiping against said teeth of said saw blade.

10. The combination comprising a cutting machine in accordance with claim 1 and a tool where said tool comprises a pair of elongate arms, each of said arms having a handle end, a working end, and a central portion, a plate on the working ends of said arms, each of said plates having an abutting surface and an outer surface, said arms pivotally joined together at said central portions with said abutting surfaces of said plates movable toward and away from each other, and said outer surfaces of said tool usable to open a weld sample cut by said cutting machining.

11. A cutting machine in accordance with claim 1 wherein said vise is non rotatably mounted on said housing.

12. A cutting machine comprising:

a housing, a rotatable blade on said housing, said blade defining a cutting plane and having an axis of rotation, slide means on said housing, a vise mounted on said slide means for movement toward and away from said blade, said vise having a first vise member and a second vise member, said first vise member moveable with respect to said second vise member, said first vise member having a first gripping surface and a second gripping surface, said second vise member having a third gripping surface and a fourth gripping surface wherein a cylindrical work piece with a longitudinal axis is retainable between said first and third gripping surfaces with said longitudinal axis in a first orientation and retainable between said second gripping surface and said fourth gripping surface in a second orientation with said longitudinal axis perpendicular to said first orientation.

13. A cutting machine in accordance with claim 12 wherein said vise is non rotatably mounted on said housing.

* * * * *

UNITED STATES PATENT AND TRADEMARK OFFICE
CERTIFICATE OF CORRECTION

PATENT NO. : 6,244,147 B1
DATED : June 12, 2001
INVENTOR(S) : Kenneth R. Pierce

It is certified that error appears in the above-identified patent and that said Letters Patent is hereby corrected as shown below:

Column 4,
Line 48, after "can" insert -- be --.

Column 6,
Line 52, after "numbers" delete "one" and substitute -- on --.

Signed and Sealed this

Twenty-sixth Day of February, 2002

Attest:

Attesting Officer

JAMES E. ROGAN
Director of the United States Patent and Trademark Office